(12) United States Patent
Chung

(10) Patent No.: US 10,641,468 B2
(45) Date of Patent: May 5, 2020

(54) LAMP DEVICE FIXING MECHANISM AND ILLUMINATION DEVICE

(71) Applicants: LITE-ON ELECTRONICS (GUANGZHOU) LIMITED, Guangzhou (CN); Lite-On Technology Corporation, Taipei (TW)

(72) Inventor: Fu-Chin Chung, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/172,857

(22) Filed: Oct. 29, 2018

(65) Prior Publication Data

US 2020/0011513 A1 Jan. 9, 2020

(30) Foreign Application Priority Data

Jul. 9, 2018 (CN) .......................... 2018 1 0744937

(51) Int. Cl.
| | | |
|---|---|---|
| *F21V 19/04* | (2006.01) | |
| *F21V 21/26* | (2006.01) | |
| *F21V 21/36* | (2006.01) | |
| *F21V 17/12* | (2006.01) | |
| *F16B 2/18* | (2006.01) | |

(52) U.S. Cl.
CPC .............. *F21V 19/04* (2013.01); *F16B 2/185* (2013.01); *F21V 17/12* (2013.01); *F21V 21/26* (2013.01); *F21V 21/36* (2013.01)

(58) Field of Classification Search
CPC ... F21V 21/14–34; F21V 21/088–0885; F21V 21/08; F21V 19/04; F21V 19/00; F21V 17/16–20; F16B 2/04; F16B 2/12; F16B 2/185; F16B 17/004; F16B 21/065; F16B 21/076; F16B 21/09; F16B 7/1418; F16B 7/1554; F16B 7/02; F16B 7/025; F16B 7/0413; F16B 7/0473; F16B 7/20; F16B 9/023

See application file for complete search history.

(56) References Cited

U.S. PATENT DOCUMENTS

| | | | | |
|---|---|---|---|---|
| 3,451,737 A | * | 6/1969 | Zerver ................. | F16B 7/025 312/201 |
| 5,046,693 A | * | 9/1991 | Browne ................. | F16B 9/023 248/159 |
| 5,497,965 A | * | 3/1996 | Mathieu, Jr. ......... | F16M 11/041 248/159 |

(Continued)

FOREIGN PATENT DOCUMENTS

| | | | |
|---|---|---|---|
| CN | 206875278 U | * | 1/2018 |
| TW | M375830 U | * | 3/2010 |

*Primary Examiner* — Mariceli Santiago
(74) *Attorney, Agent, or Firm* — JCIPRNET

(57) ABSTRACT

A lamp device fixing mechanism adapted to be fixed to a lamp rod is provided. The lamp device fixing mechanism includes a casing, a rotating handle, and a fixing member. The casing is adapted to be partially inserted into the lamp rod. The rotating handle is pivoted to the casing. The fixing member is movably disposed at the casing and moved with the rotating handle. The fixing member moves from a first position to a second position along with rotation of the rotating handle to be fixed to the lamp rod. An illumination device is further provided.

17 Claims, 11 Drawing Sheets

(56) References Cited

U.S. PATENT DOCUMENTS

| | | | |
|---|---|---|---|
| 5,800,053 A * | 9/1998 | Shen | F21V 21/22 |
| | | | 362/285 |
| 2004/0211034 A1* | 10/2004 | Chen | F16B 7/1463 |
| | | | 16/113.1 |
| 2016/0325928 A1* | 11/2016 | Lepek | F16B 2/14 |

* cited by examiner

LAMP DEVICE FIXING MECHANISM AND ILLUMINATION DEVICE

CROSS-REFERENCE TO RELATED APPLICATION

This application claims the priority benefit of China application serial no. 201810744937.8, filed on Jul. 9, 2018. The entirety of the above-mentioned patent application is hereby incorporated by reference herein and made a part of this specification.

BACKGROUND

Technical Field

The invention relates to a fixing mechanism and a device having the fixing mechanism. More particularly, the invention relates to a lamp device fixing mechanism and an illumination device having the lamp device fixing mechanism.

Description of Related Art

Currently, a lamp device is installed on a lamp rod through screws most of the time. In this way, tools such as a screwdriver and the like are thus required for the lamp device to be installed on the lamp rod. Moreover, much time and effort is needed during installation as the screws have to be locked one by one. In addition, the screws may collapse owing to improper force application when being locked, so it may be difficult to remove the screws during follow-up repair of the lamp device, and much effort may thus be needed.

SUMMARY

The invention provides a lamp device fixing mechanism which can be directly fixed to a lamp rod without additional tools.

The invention further provides an illumination device having the lamp device fixing mechanism.

In an embodiment of the invention, a lamp device fixing mechanism is adapted to be fixed to a lamp rod, and the lamp device fixing mechanism includes a casing, a rotating handle, and a fixing member. The casing is adapted to be partially inserted into the lamp rod. The rotating handle is pivoted to the casing. The fixing member is movably disposed at the casing and moved with the rotating handle. Along with rotation of the rotating handle, the fixing member moves from a first position retracted into the casing to a second position protruding from the casing, so that the fixing member is adapted to be fixed to the lamp rod.

In an embodiment of the invention, the lamp device fixing mechanism further includes a pushing rod movably disposed in the casing along a first axis and disposed between the rotating handle and the fixing member. The rotating handle rotates to push the pushing rod to move along the first axis. The pushing rod pushes the fixing member to move along a second axis, and the fixing member protrudes from the casing.

In an embodiment of the invention, the pushing rod includes a first end portion, and the first end portion is shaped as a cone. The fixing member includes an inclined surface corresponding to the first end portion, and the inclined surface of the fixing member is propped against the first end portion of the pushing rod.

In an embodiment of the invention, the casing has an opening. The fixing member is located in the casing, and a portion of the fixing member is adapted to protrude from the opening. The fixing member includes a stopping protrusion. A width of the stopping protrusion is greater than a width of the opening so that the fixing member is restrained from leaving the casing through the opening.

In an embodiment of the invention, the first end portion of the pushing rod has a first slope or a second slope, and the first slope is greater than the second slope. The lamp rod is adapted to include a first internal diameter or a second internal diameter, and the first internal diameter is greater than the second internal diameter. When the first end portion of the pushing rod has the first slope, the pushing rod is adapted to enable the fixing member to be fixed to the lamp rod having the first internal diameter. When the first end portion of the pushing rod has the second slope, the pushing rod is adapted to enable the fixing member to be fixed to the lamp rod having the second internal diameter.

In an embodiment of the invention, the rotating handle includes a handle exposed outside the casing and a cam located in the casing. The pushing rod includes a second end portion, and the cam abuts against the second end portion.

In an embodiment of the invention, the fixing member includes a first end and a second end opposite to each other and a pivoting portion located between the first end and the second end. The pivoting portion of the fixing member is pivoted to the casing. The rotating handle includes a cam located in the casing, and the cam abuts against the first end. The rotating handle drives the fixing member to rotate, and the second end of the fixing member correspondingly protrudes and extends from the casing.

In an embodiment of the invention, the lamp device fixing mechanism further includes a linking rod pivoted to the rotating handle and the fixing member. The casing has an opening for the fixing member to extend outwards, and a wall surface of the casing surrounding the opening is shaped as an inclined surface or an arc surface. The rotating handle rotates so that the linking rod drives the fixing member, and the fixing member protrudes from the casing along the wall surface of the casing.

In an embodiment of the invention, the fixing member includes a pressing surface configured to be in contact with an internal wall surface of the lamp rod, and the pressing surface includes a rough surface or a plurality of nicks.

In an embodiment of the invention, the fixing member includes an engaging block or a hook, and the lamp rod is adapted to include an engaging hole corresponding to the fixing member.

In an embodiment of the invention, the casing includes a first stopping surface, and the rotating handle abuts against the first stopping surface when the fixing member is located at the first position.

In an embodiment of the invention, the casing includes a second stopping surface, and a handle portion of the rotating handle is located next to the second stopping surface when the fixing member is located at the second position.

In an embodiment of the invention, the casing includes a first segment portion, a second segment portion, and a breach located at a junction of the first segment portion and the second segment portion. The breach is configured to make room for the rotating handle to move. The first stopping surface and the second stopping surface are respectively located at two opposite inner side walls of the inner side walls forming the breach.

In an embodiment of the invention, the fixing member is retracted into the casing when the fixing member is located at the first position. The fixing member protrudes from the casing when the fixing member is located at the second position.

In an embodiment of the invention, the casing includes a first segment portion, a second segment portion, and an abutting portion located between the first segment portion and the second segment portion. When the first segment portion of the lamp device fixing mechanism is inserted into the lamp rod, the abutting portion of the casing is adapted to abut against a nozzle edge of the lamp rod.

In an embodiment of the invention, an illumination device includes a lamp device, a lamp rod, and the lamp device fixing mechanism. The lamp device is fixed to the casing of the lamp device fixing mechanism. A portion of the casing of the lamp device fixing mechanism is partially inserted into the lamp rod. The fixing member is fixed to the lamp rod when moving to the second position, so as to fix the lamp device fixing mechanism to the lamp rod.

In an embodiment of the invention, the lamp rod has an engaging hole, and the fixing member extends into the engaging hole of the lamp rod when the fixing member is located at the second position.

To sum up, in the lamp device fixing mechanism provided by the invention, when the rotating handle is rotated, the fixing member is designed to be driven to protrude from the casing. In this way, the fixing member protruding from the casing may be fixed to the lamp rod. Therefore, a user may enjoy a convenient using experience and requires no additional tools when operating on the lamp device fixing mechanism.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
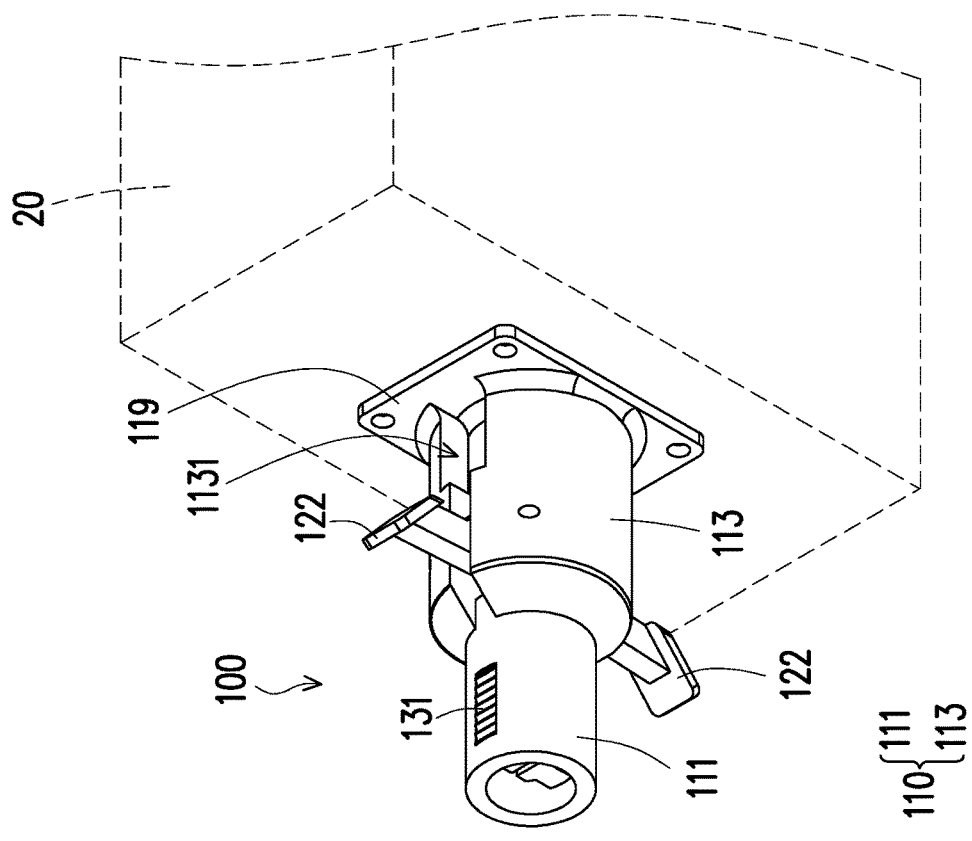
FIG. 1A is a schematic view of an illumination device according to an embodiment of the invention.
Figure 1A:
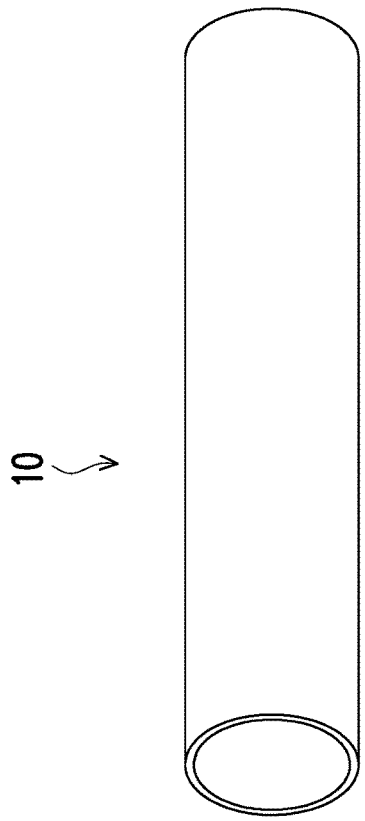
Figure 2A:
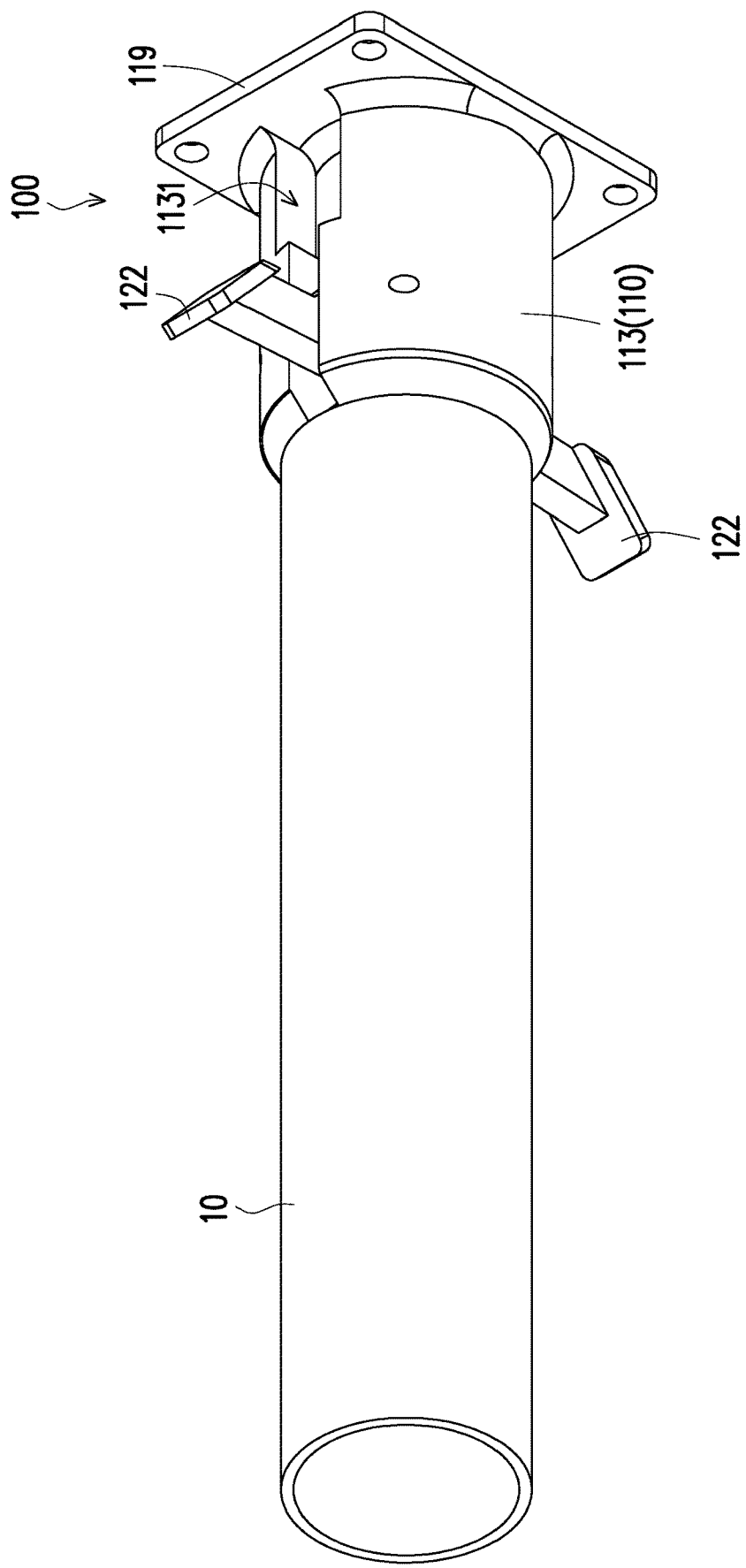
FIG. 2A, FIG. 3, and FIG. 4A are schematic views of rotation of rotating handles after a lamp device fixing mechanism of FIG. 1A is inserted into a lamp rod.
Figure 3:
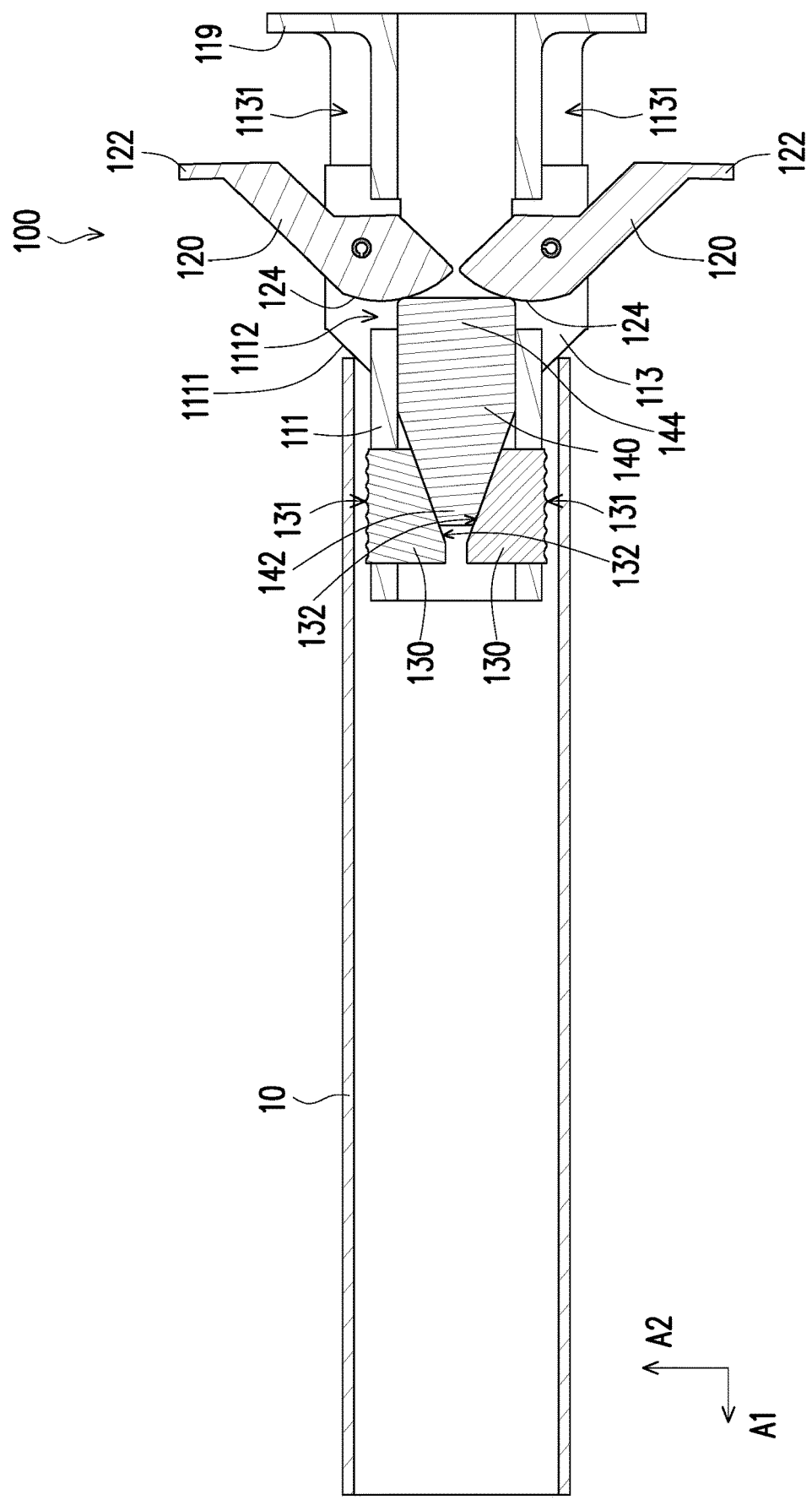
Figure 4A:
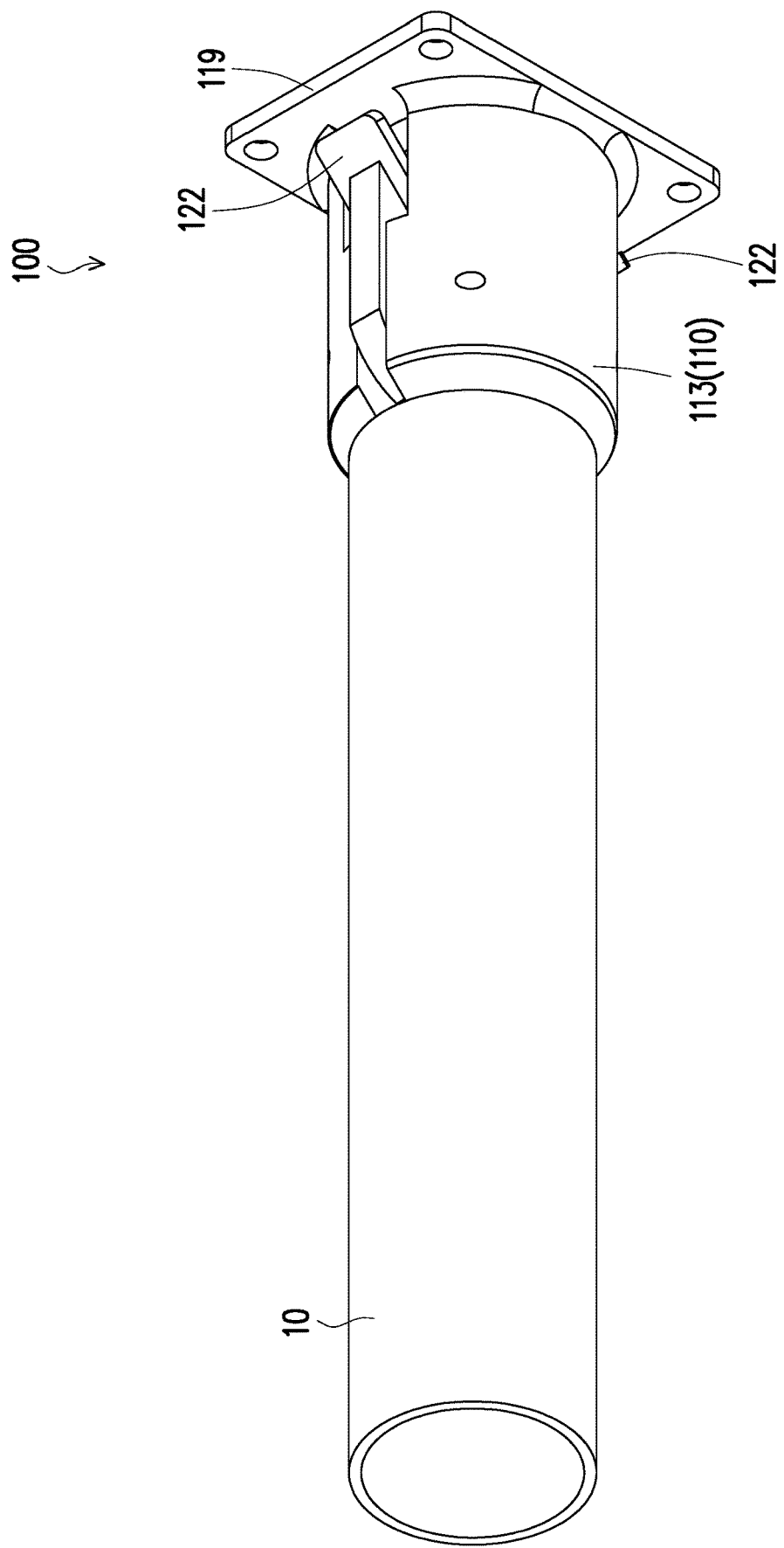

FIG. 1A is a schematic view of an illumination device according to an embodiment of the invention. FIG. 2A, FIG. 3, and FIG. 4A are schematic views of rotation of rotating handles after a lamp device fixing mechanism of FIG. 1A is inserted into a lamp rod. With reference to FIG. 1A, FIG. 2A, FIG. 3, and FIG. 4A, in this embodiment, an illumination device includes a lamp rod 10, a lamp device 20, and a lamp device fixing mechanism 100. The illumination device is, for example, a streetlamp, but a type of the illumination device is not limited in this regard. The lamp device fixing mechanism 100 is adapted to fix the lamp device 20 (shown in FIG. 1A) to the lamp rod 10. The lamp device 20 may be fixed onto the lamp device fixing mechanism 100 first and then is fixed to the lamp rod 10 together with the lamp device fixing mechanism 100. The lamp device 20 is, for example, a streetlamp, but a type of the lamp device 20 is not limited in this regard. The lamp device fixing mechanism 100 of this embodiment allows a user to fix the lamp device fixing mechanism 100 to the lamp rod 10 without using any additional tool (e.g., a screw, a screwdriver, and other tools used for fixing) and thus provides an easy and convenient using experience.

Figure 1B:
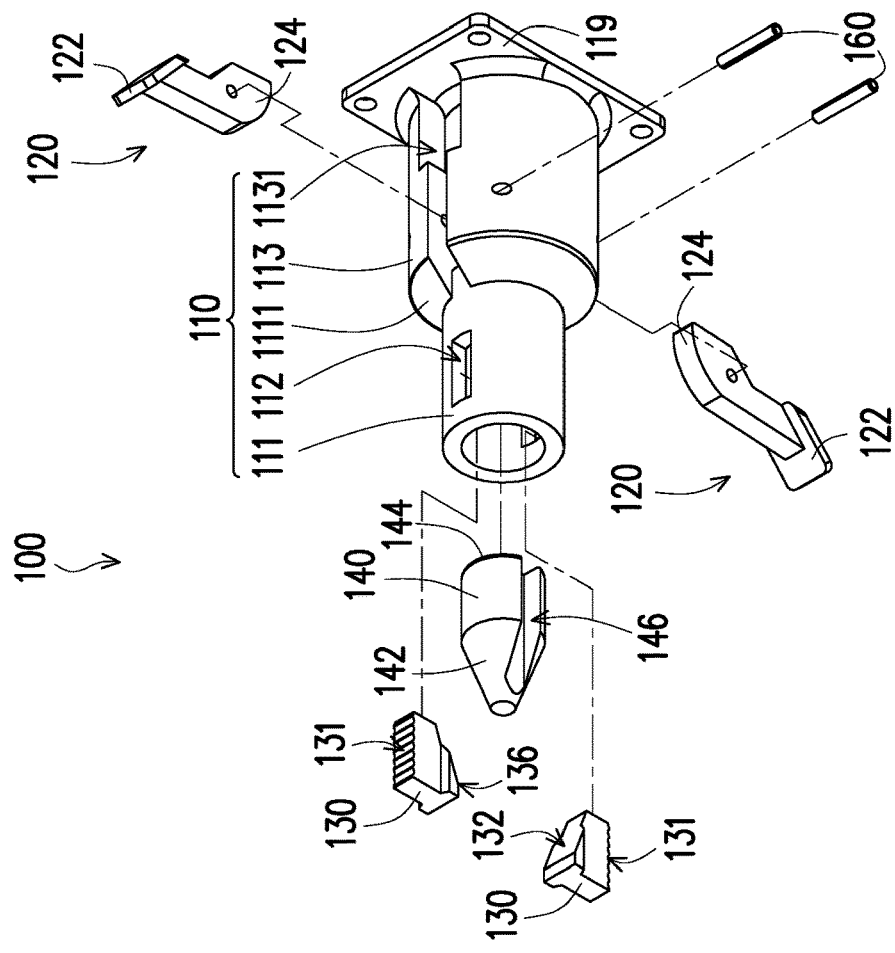
FIG. 1B is a schematic exploded view of FIG. 1A.
Figure 1B:
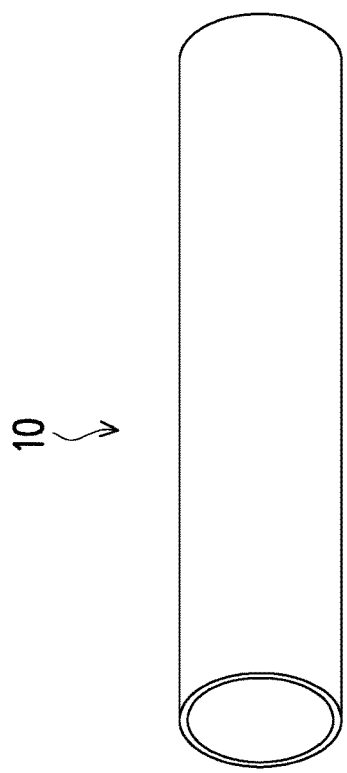
Figure 2B:
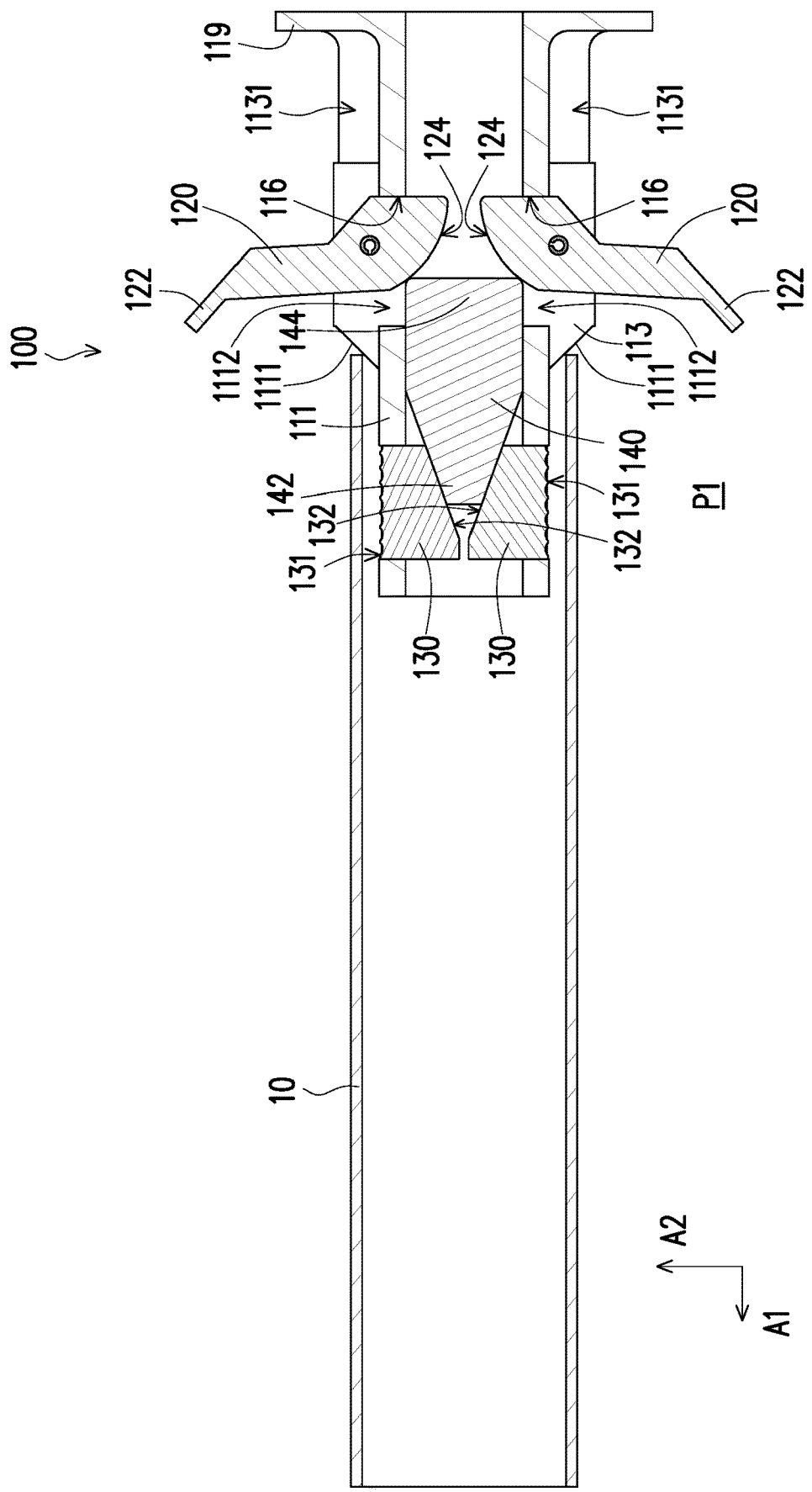
FIG. 2B and FIG. 4B respectively are cross-sectional views of FIG. 2A and FIG. 4A.
Figure 4B:
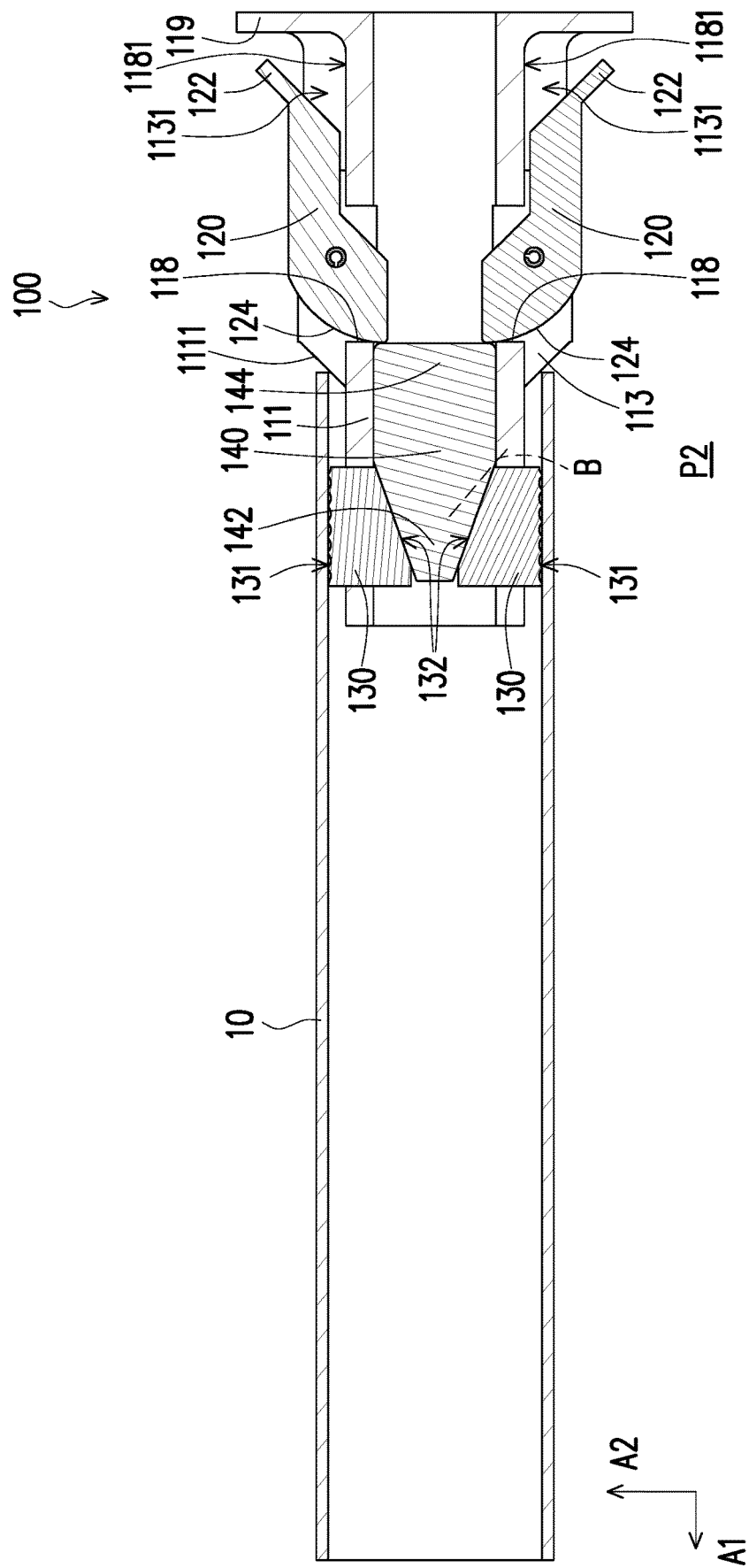

FIG. 1B is a schematic exploded view of FIG. 1A. FIG. 2B and FIG. 4B respectively are cross-sectional views of FIG. 2A and FIG. 4A. FIG. 3 is a schematic cross-sectional view of a rotating process of rotating handles. With reference to FIG. 1B to FIG. 4B, in this embodiment, the lamp device fixing mechanism 100 includes a casing 110, at least one rotating handle 120, and at least one fixing member 130. The casing 110 is adapted to be partially inserted into the lamp rod 10. In this embodiment, the casing 110 includes a first segment portion 111, a second segment portion 113, and a base 119. The second segment portion 113 is located between the base 119 and the first segment portion 111. The base 119 is configured to be fixed on the lamp device 20 (shown in FIG. 1A). When the lamp device fixing mechanism 100 is inserted into the lamp rod 10, the first segment portion 111 of the casing 110 is located in the lamp rod 10, and the second segment portion 113 of the casing 110 is exposed outside the lamp rod 10. In this embodiment, a diameter of the first segment portion 111 is less than a diameter of the second segment portion 113, but size relationships and shapes of the first segment portion 111 and the second segment portion 113 are not limited in this regard. In addition, the casing 110 has at least one opening 112 for the at least one fixing member 130 to extend therethrough. In this embodiment, the number of the at least one rotating handle 120 and the number of the at least one fixing member 130 are respectively two. The rotating handles 120 and the fixing members 130 are located at relative positions at the casing 110, and thus, the number of the at least one opening 112 is correspondingly two. Nevertheless, in other embodiments, the numbers and positions of the rotating handles 120, the fixing members 130, and the openings 112 are not limited in this regard, and the numbers of the rotating handles 120, the fixing members 130, and the openings 112 are at least one.

In this embodiment, the rotating handles 120 are pivoted to the second segment portion 113 of the casing 110, and the rotating handles 120 are pivoted to the second segment portion 113 through, for example, latch members 160 shown in FIG. 1B. The second segment portion 113 has at least one notch 1131 configured to receive the rotating handles 120. That is, when the rotating handles 120 approach the second segment portion 113, the rotating handles 120 may be located in the at least one notch 1131. As shown in FIG. 2B, FIG. 3B, and FIG. 4B, when the lamp device fixing mechanism 100 is inserted into the lamp rod 10, portions of the rotating handles 120 are exposed outside to be held by a user and may rotate relative to the casing 110. In addition, in this embodiment, the fixing members 130 may be movably disposed at the casing 110 and moved with the rotating handles 120. Along with rotation of the rotating handles 120, the fixing members 130 move from a first position P1 (FIG. 2B) retracted into the casing 110 to a second position P2 (FIG. 4B) protruding from the casing 110, so that the fixing members 130 are adapted to be fixed to an internal wall surface of the lamp rod 10.

To be specific, in this embodiment, the lamp device fixing mechanism 100 may further include a pushing rod 140 movably disposed in the first segment portion 111 of the casing 110 along a first axis A1 and disposed between the rotating handles 120 and the fixing members 130. Each of the rotating handles 120 includes a handle 122 exposed outside the casing 110 and a cam 124 located in the casing 110. The handles 122 are moved with the cams 124. The pushing rod 140 includes a first end portion 142 and a second end portion 144 opposite to each other and a recessed portion 146 (FIG. 1B) recessed in a side wall of the first end portion 142 and a side wall of the second end portion 144. The recessed portion 146 may be configured to make room for a power line such that the power line can penetrate the pushing rod 140. The first end portion 142 of the pushing rod 140 is near the fixing members 130, and the second end portion 144 of the pushing rod 140 is near the cams 124 of the rotating handles 120. In this embodiment, the first end portion 142 of the pushing rod 140 is shaped as a cone, and each of the fixing members 130 includes an inclined surface 132 corresponding to the first end portion 142 and a stopping protrusion 136 (FIG. 1B). The inclined surfaces 132 of the fixing members 130 are propped against the first end portion 142 of the pushing rod 140, and the cams 124 of the rotating handles 120 abut against the second end portion 144. In this embodiment, a width of each of the stopping protrusions 136 is greater than a width of each of the openings 112. In this way, the stopping protrusions 136 abut against an inner surface of first segment portion 111 of the casing 110 close to the openings 112, such that the fixing members 130 do not fall from the openings 112.

In this embodiment, when the handles 122 of the rotating handles 120 rotate from FIG. 2B to FIG. 4B, since outer contours of the cams 124 of the rotating handles 120 are shaped as a portion of an arc of an eccentric circle, outer edges of the cams 124 push the pushing rod 140. Hence, when moving along the first axis A1 (e.g., a left and right direction) in the first segment portion 111 of the casing 110, the pushing rod 140 at the same time pushes the fixing members 130 to move along a second axis A2 (e.g., an up and down direction), as such, the fixing members 130 protrude from the casing 110. In other embodiments, the directions of the first axis A1 and the second axis A2 are not limited to the above.

In this embodiment, the fixing members 130 may protrude and extend from the casing 110 through rotation of the rotating handles 120, so as to be pressed against the internal wall surface of the lamp rod 10, and that the lamp device fixing mechanism 100 is fixed. No additional tool is required to be used for operation or fixing purposes, and the user may therefore enjoy a convenient using experience.

In addition, in this embodiment, the fixing members 130 protruding from the casing 110 are fixed to the lamp rod 10 through being pressed against the internal wall surface of the lamp rod 10. Each of the fixing members 130 includes a pressing surface 131 configured to be in contact with the internal wall surface of the lamp rod 10. In this embodiment, each of the pressing surfaces 131 may selectively include a rough surface or a plurality of nicks, so as to increase a friction force between the pressing surfaces 131 of the fixing members 130 and the internal wall surface of the lamp rod 10 when the pressing surfaces 131 are in contact with the internal wall surface of the lamp rod 10. Certainly, in other embodiments, the form of the pressing surfaces 131 is not limited in this regard.

In addition, as shown in FIG. 4B, the casing 110 further includes an abutting portion 1111 located between the first segment portion 111 and the second segment portion 113 in this embodiment. When the first segment portion 111 of the lamp device fixing mechanism 100 is inserted into the lamp rod 10, the abutting portion 1111 of the casing 110 abuts against a nozzle edge of the lamp rod 10. In this way, the rotating handles 120 may rotate freely, and when the rotating handles 120 rotates, the casing 110 of the lamp device fixing mechanism 100 is less likely to wobble relative to the lamp rod 10, and the lamp device fixing mechanism 100 may thereby deliver favorable operational stability.

In this embodiment, the first segment portion 111 and the second segment portion 113 of the casing 110 are integrally formed. The casing 110 further includes a breach 1112 located at a junction of the first segment portion 111 and the second segment portion 113 to make room for the rotating handles 120 to move at portions close to the cams 124.

In addition, as shown in FIG. 2B, the casing 110 includes first stopping surfaces 116, and the rotating handles 120 abut against the first stopping surfaces 116 when the fixing members 130 are located at the first position P1 in this embodiment. As shown in FIG. 4B, the casing 110 includes second stopping surfaces 118, and the cams 124 of the rotating handles 120 are restrained by the second stopping surfaces 118 of the casing 110 and that the rotating handles 120 no longer continue to rotate when the fixing members 130 are located at the second position P2 in this embodiment. In other words, in this embodiment, the first stopping surfaces 116 and the second stopping surfaces 118 of the casing 110 may be configured to restrain a rotation range of the rotating handles 120. The first stopping surfaces 116 and the second stopping surfaces 118 respectively are two end terminals of the breach 1112. That is, the first stopping surfaces 116 and the second stopping surfaces 118 are respectively located at two opposite inner side walls forming the breach 1112. In addition, in this embodiment, the casing 110 also includes third stopping surfaces 1181, and the handles 122 of the rotating handles 120 are located next to the third stopping surfaces 1181 when the fixing members 130 are located at the second position P2. In this embodiment, the second stopping surfaces 118 and the third stopping surfaces 1181 of the casing 110 may together act as a stopping structure to stop the rotating handles 120 from continuously rotating when the fixing members 130 are located at the second position P2. Certainly, in other embodiments, only the second stopping surfaces 118 or the third stopping surfaces 1181 may be selectively disposed. Alternatively, in other embodiments, the rotation range of the rotating handles 120 may be defined by other structures, and in such a case, the casing 110 may not have to include the first stopping surfaces 116 and the second stopping surfaces 118 configured to restrain the rotation range of the rotating handles 120 either, and the form of the casing 110 is not limited in this regard. Note that, the lamp rod 10 has a plurality of specific internal diameter sizes in general. A manufacturer of the lamp device fixing mechanism 100 of this embodiment may adjust an extent to which the fixing members 130 protrude from the casing 110 through selectively using the pushing rod 140 having the first end portion 142 (i.e., the cone portion) with different slopes and the fixing members 130 corresponding to the pushing rod 140. In this way, the lamp device fixing mechanism 100 having the pushing rod 140 with different slopes may be applied to the lamp rod 10 featuring different internal diameters.

That is, the lamp rod 10 may include different sizes, for example, the lamp rod 10 may include a first internal diameter or a second internal diameter, and the first internal diameter is greater than the second internal diameter. The manufacturer may selectively manufacture the first end portion 142 of pushing rod 140 to have a first slope or a second slope or have both the slopes according to the lamp rod 10 to be used together, wherein the first slope is greater than the second slope. When the first end portion 142 of the pushing rod 140 has the first slope (the greater slope), the lamp device fixing mechanism 100 may be used together with the lamp rod 10 having the first internal diameter (the greater internal diameter). In this way, the pushing rod 140 having the first slope (the greater slope) may allow the corresponding fixing members 130 to be fixed to the lamp rod 10 having the first internal diameter (the greater internal diameter). Similarly, when the first end portion 142 of the pushing rod 140 has the second slope (the smaller slope), the lamp device fixing mechanism 100 may be used together with the lamp rod 10 having the second internal diameter (the smaller internal diameter). In this way, the pushing rod 140 having the second slope (the smaller slope) may allow the corresponding fixing members 130 to be fixed to the lamp rod 10 having the second internal diameter (the smaller internal diameter).

To be more specific, if the slope of the first end portion 142 (i.e., the cone portion) of the pushing rod 140 increases (as shown by the dotted lines B), when the pushing rod 140 moves along the first axis A1, a distance by which the fixing members 130 are pushed out along the second axis A2 increases. In other words, the distance by which the fixing members 130 extend out of the casing 110 may be slightly adjusted through adjusting the slope of the first end portion 142 of the pushing rod 140. When the slope increases, the distance by which the fixing members 130 extend out of the casing 110 increases. Therefore, for the lamp device fixing mechanism 100 to be applied to the lamp rod 10 with a greater internal diameter, only the pushing rod 140 with the first end portion 142 having a greater slope and the fixing members 130 corresponding to the pushing rod 140 are required to be selected. In this way, a height (that is, the distance by which the fixing members 130 move along the second axis A2) to which the fixing members 130 extend out of the casing 110 is greater, such that the fixing members 130 can press against the internal wall surface of the lamp rod 10 having a greater internal diameter. Similarly, for the lamp device fixing mechanism 100 to be applied to the lamp rod 10 with a smaller internal diameter, only the pushing rod 140 with the first end portion 142 having a smaller slope and the fixing members 130 corresponding to the pushing rod 140 are required to be selected. In this way, the fixing members 130 can press against to the internal wall surface of the lamp rod 10 having a smaller internal diameter.

In other words, for the lamp device fixing mechanism 100 to be applied to the lamp rod 10 featuring different internal diameters, the manufacturer only has to adjust types of the pushing rod 140 and the fixing members 130, and other members (e.g., the casing 110 and the rotating handles 120) of the lamp device fixing mechanism 100 except the pushing rod 140 and the fixing members 130 may be shared. Therefore, less molds used to manufacture the lamp device fixing mechanism 100 are required, and the manufacturing costs may be lowered.

Figure 4C:
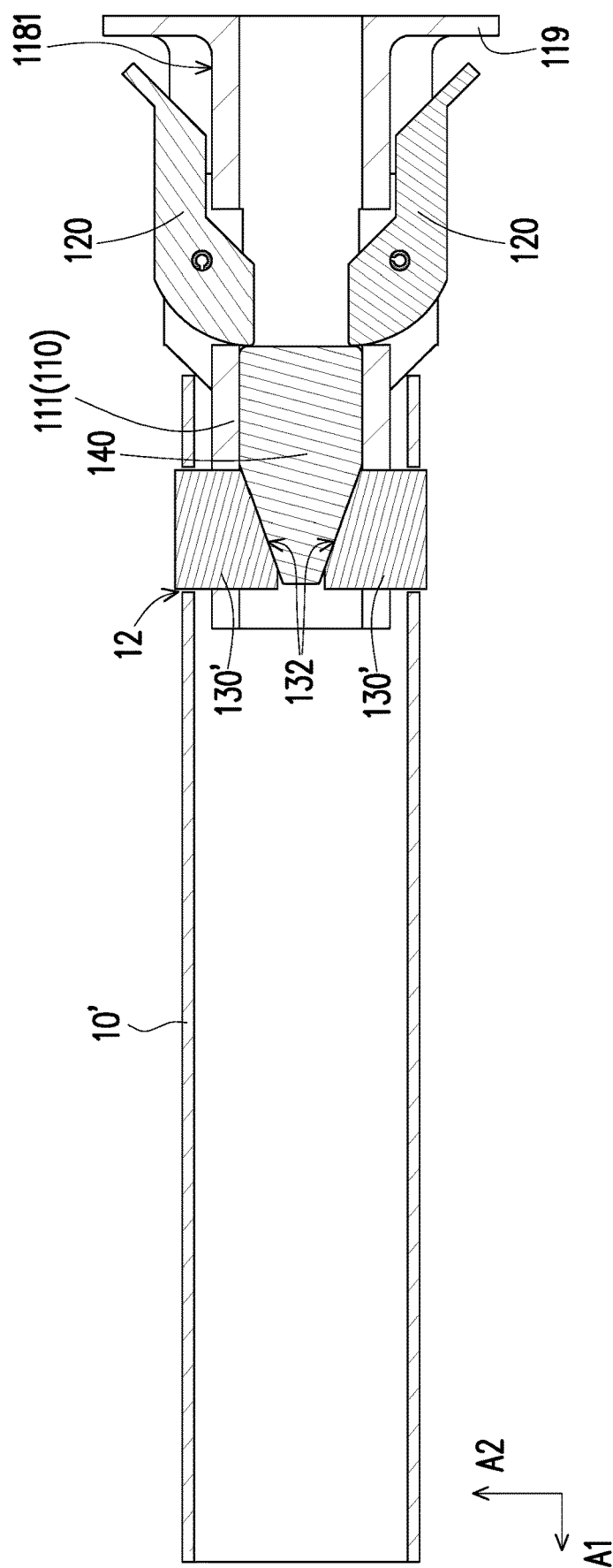
FIG. 4C is a schematic view of a lamp device fixing mechanism and a lamp rod according to another embodiment of the invention.

FIG. 4C is a schematic view of a lamp device fixing mechanism and a lamp rod according to another embodiment of the invention. With reference to FIG. 4C, in this embodiment, fixing members 130' are fixed to a lamp rod 10' through an engaging manner. To be specific, in this embodiment, each of the fixing members 130' includes an engaging block, and the lamp rod 10' includes engaging holes 12 corresponding to the fixing members 130'. The rotating handles 120 rotate to push the pushing rod 140, and the pushing rod 140 pushes the fixing members 130'. In this way, the fixing members 130' protrude outwards from the first end portion 111 of the casing 110 and is fixed until penetrating the engaging holes 12 of the lamp rod 10'. Certainly, in other embodiments, each of the fixing members 130' may also include a hook, and the form of the fixing members 130' is not limited in this regard.

Figure 5:
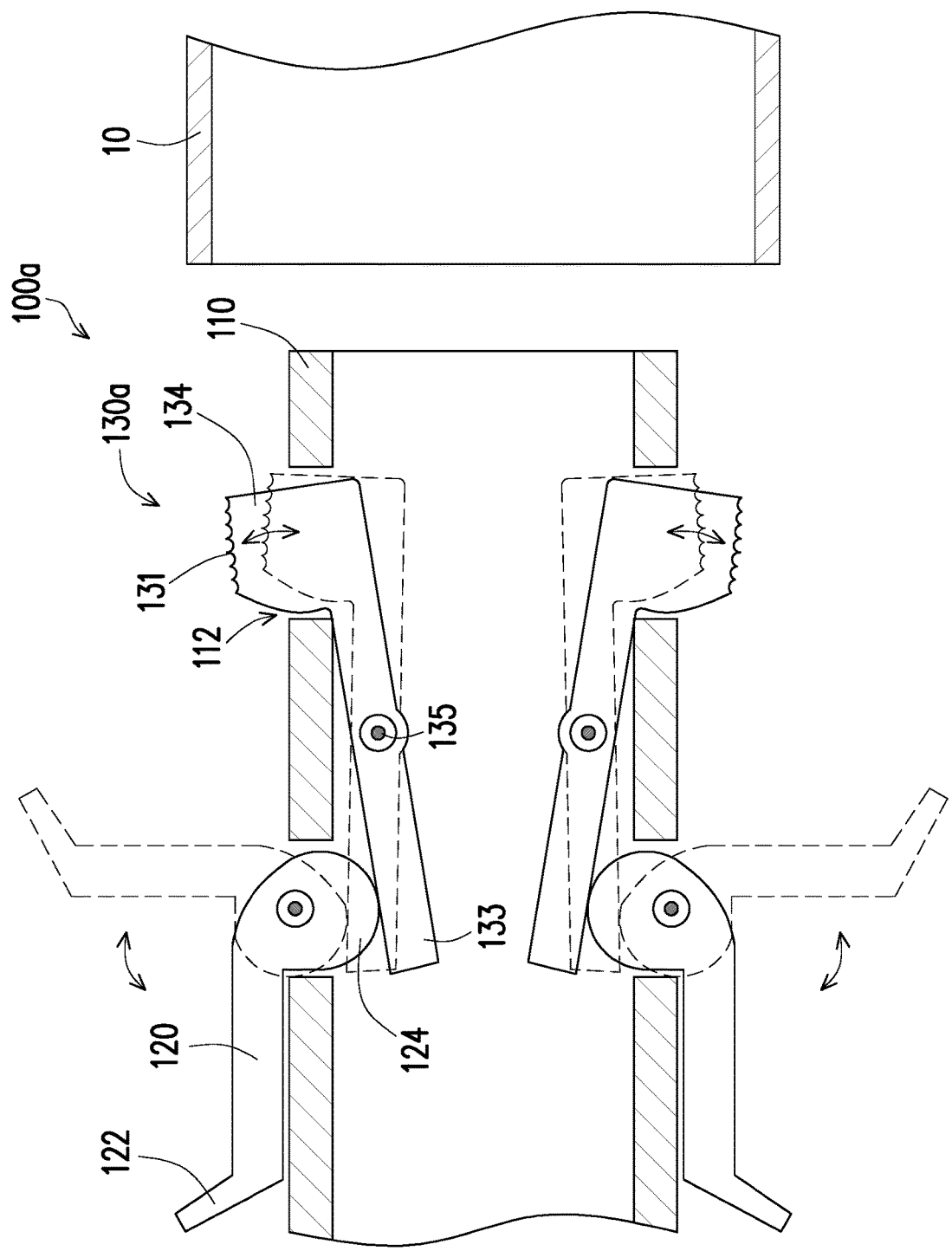
FIG. 5 is a schematic view of a lamp device fixing mechanism and a lamp rod according to another embodiment of the invention.

FIG. 5 is a schematic view of a lamp device fixing mechanism and a lamp rod according to another embodiment of the invention. The dotted lines in FIG. 5 refers to a position of the lamp device fixing mechanism before being fixed, and the solid lines refer to a position of the lamp device fixing mechanism after being fixed. For clarity, movement of the lamp device fixing mechanism is described as the lamp device fixing mechanism is not disposed in the lamp rod. With reference to FIG. 5, in this embodiment, a lamp device fixing mechanism 100a includes the casing 110, the rotating handles 120, and fixing members 130a. Each of fixing members 130a includes a first end 133 and a second end 134 opposite to each other and a pivoting portion 135 located between the first end 133 and the second end 134. The pivoting portions 135 of the fixing members 130a are pivoted to the casing 110. The cams 124 of the rotating handles 120 abut against the first ends 133 of the fixing members 130a. When the rotating handles 120 are rotated, the cams 124 of the rotating handles 120 push the first ends 133 of the fixing members 130a. The fixing members 130a rotate around the pivoting portions 135, so that the second ends 134 of the fixing members 130a correspondingly protrude and extend from the openings 122 of the casing 110 to be fixed.

Figure 6:
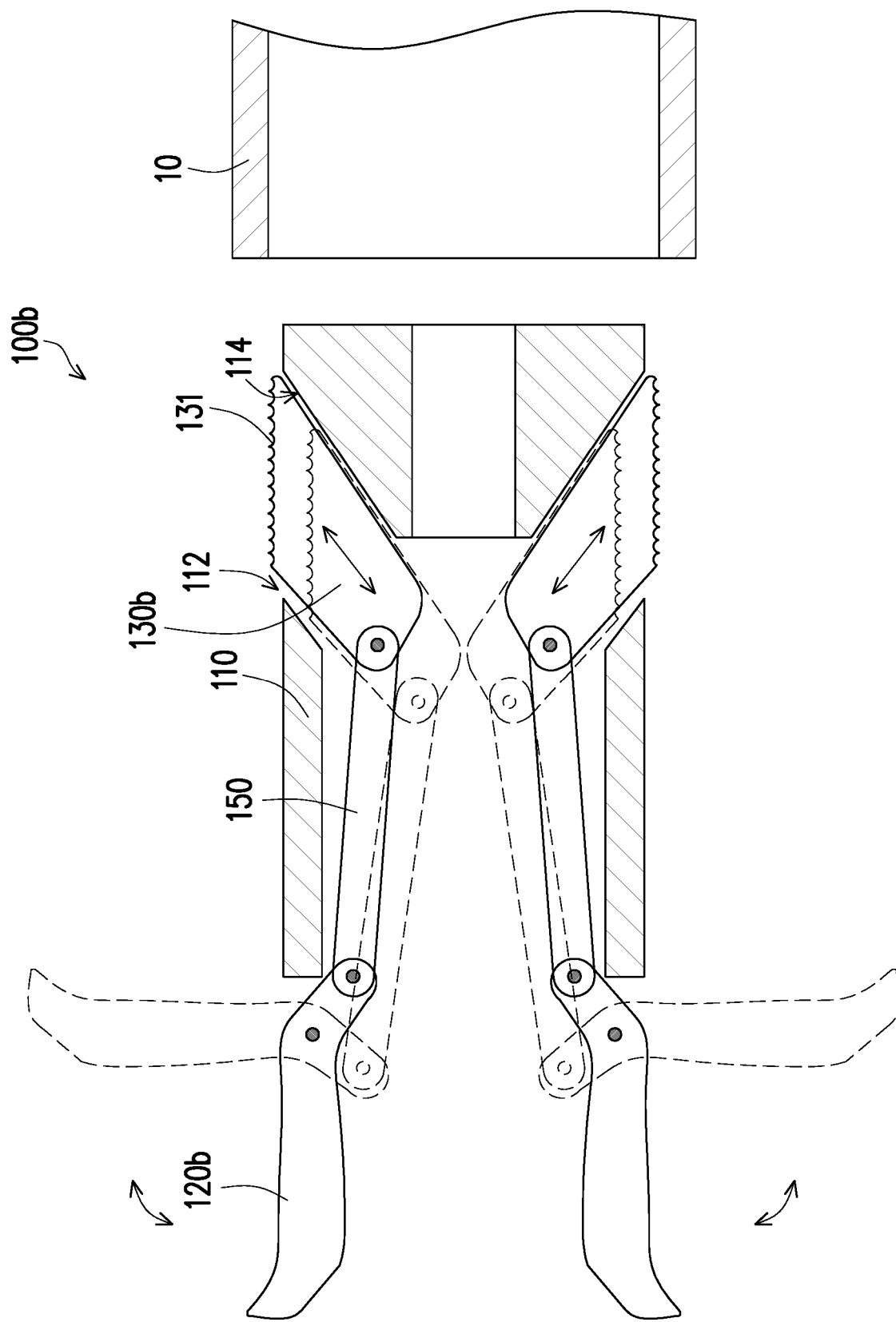
FIG. 6 is a schematic view of a lamp device fixing mechanism and a lamp rod according to another embodiment of the invention.

FIG. 6 is a schematic view of a lamp device fixing mechanism and a lamp rod according to another embodiment of the invention. The dotted lines in FIG. 6 refers to a position of the lamp device fixing mechanism before being fixed, and the solid lines refer to a position of the lamp device fixing mechanism after being fixed. For clarity, movement of the lamp device fixing mechanism is described as the lamp device fixing mechanism is not disposed in the lamp rod. With reference to FIG. 6, in this embodiment, a lamp device fixing mechanism 100b includes rotating handles 120b, fixing members 130b, and linking rods 150. The linking rods 150 are respectively pivoted to the rotating handles 120b and the fixing members 130b. In this embodiment, the rotating handles 120b and the fixing members 130b are respectively pivoted to two opposite ends of the linking rods 150, but are not limited thereto. As shown in FIG. 6, the casing 110 has openings 112 for the fixing members 130b to extend outwards, and wall surfaces 114 of the casing 110 surrounding the openings 112 are shaped as inclined surfaces or arc surfaces. When the rotating handles 120b are rotated, the linking rods 150 correspondingly move and drive the fixing members 130b. The fixing members 130b protrude from the casing 110 along contours of the wall surfaces 114 of the casing 110. In this embodiment, the wall surfaces 114 of the casing 110 surrounding the openings 112 are designed to be inclined surfaces or an arc surfaces, and in this way, the fixing members 130b may smoothly protrude from the casing 110. As such, the fixing members 130b are less likely to interfere with the casing 110 when moving.

Figure 7:
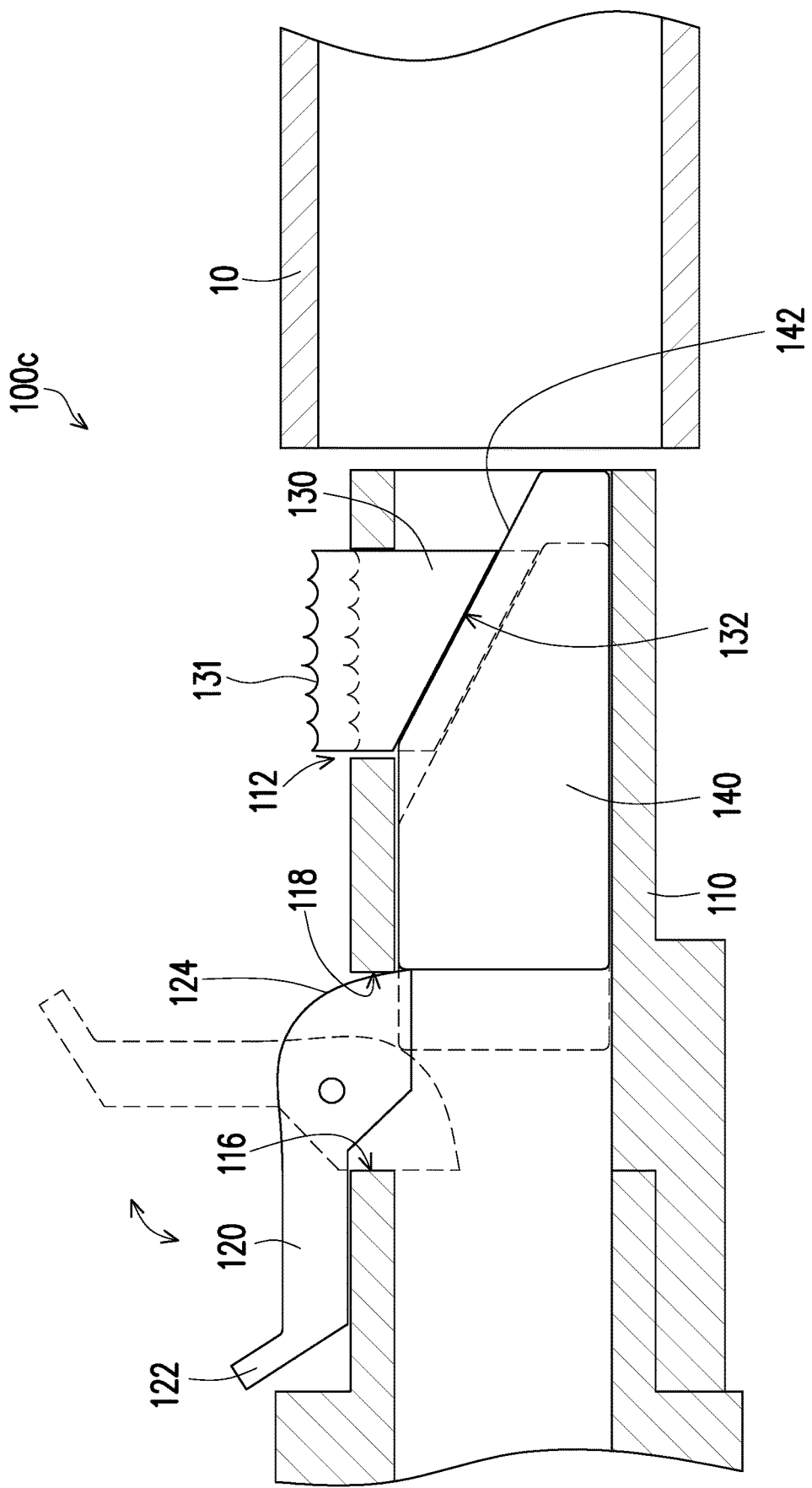
FIG. 7 is a schematic view of a lamp device fixing mechanism and a lamp rod according to another embodiment of the invention.

FIG. 7 is a schematic view of a lamp device fixing mechanism and a lamp rod according to another embodiment of the invention. The dotted lines in FIG. 7 refers to a position of the lamp device fixing mechanism before being fixed, and the solid lines refer to a position of the lamp device fixing mechanism after being fixed. For clarity, movement of the lamp device fixing mechanism is described as the lamp device fixing mechanism is not disposed in the lamp rod. With reference to FIG. 7, a lamp device fixing mechanism 100c pushes the pushing rod 140 through movement of a single rotating handle 120 in this embodiment, so as to push the fixing member 130. As such, the fixing member 130 may protrude from the opening 112 of the casing 110, so the pressing surface 131 is in contact with the internal wall surface of the lamp rod 10, and that the fixing member 130 is fixed.

In view of the foregoing, in the lamp device fixing mechanism provided by the invention, when the rotating handles are rotated, the fixing members are designed to be driven to protrude from the casing. In this way, the fixing members protruding from the casing may be fixed to the lamp rod. Therefore, a user may enjoy a convenient using experience and requires no additional tools when operating on the lamp device fixing mechanism.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lamp device fixing mechanism, adapted to be fixed to a lamp rod, the lamp device fixing mechanism comprising:
    a casing, adapted to be partially inserted into the lamp rod;
    a rotating handle, pivoted to the casing; and
    a fixing member, movably disposed at the casing and moved with the rotating handle, wherein the fixing member moves from a first position to a second position along with rotation of the rotating handle so that the fixing member is adapted to be fixed to the lamp rod.

2. The lamp device fixing mechanism as claimed in claim 1, further comprising:
    a pushing rod, movably disposed in the casing along a first axis and disposed between the rotating handle and the fixing member, the rotating handle rotating to push the pushing rod to move along the first axis, the pushing rod pushing the fixing member to move along a second axis, the fixing member protruding from the casing.

3. The lamp device fixing mechanism as claimed in claim 2, wherein the pushing rod comprises a first end portion, the first end portion is shaped as a cone, the fixing member comprises an inclined surface corresponding to the first end portion, and the inclined surface of the fixing member is propped against the first end portion of the pushing rod.

4. The lamp device fixing mechanism as claimed in claim 3, wherein the casing has an opening, the fixing member is located in the casing, a portion of the fixing member is adapted to protrude from the opening, the fixing member comprises a stopping protrusion, and a width of the stopping protrusion is greater than a width of the opening so that the fixing member is restrained from leaving the casing through the opening.

5. The lamp device fixing mechanism as claimed in claim 3, wherein the first end portion of the pushing rod has a first slope or a second slope, the first slope is greater than the second slope, the lamp rod is adapted to comprise a first internal diameter or a second internal diameter, the first internal diameter is greater than the second internal diameter, the pushing rod is adapted to enable the fixing member to be fixed to the lamp rod having the first internal diameter when the first end portion of the pushing rod has the first slope, and the pushing rod is adapted to enable the fixing member to be fixed to the lamp rod having the second internal diameter when the first end portion of the pushing rod has the second slope.

6. The lamp device fixing mechanism as claimed in claim 2, wherein the rotating handle comprises a handle exposed outside the casing and a cam located in the casing, the pushing rod comprises a second end portion, and the cam abuts against the second end portion.

7. The lamp device fixing mechanism as claimed in claim 1, wherein the fixing member comprises a first end and a second end opposite to each other and a pivoting portion located between the first end and the second end, the pivoting portion of the fixing member is pivoted to the casing, the rotating handle comprises a cam located in the casing, the cam abuts against the first end, the rotating handle drives the fixing member to rotate, and the second end of the fixing member correspondingly protrudes and extends from the casing.

8. The lamp device fixing mechanism as claimed in claim 1, further comprising:
    a linking rod, pivoted to the rotating handle and the fixing member, the casing comprising an opening for the fixing member to extend, a wall surface of the casing surrounding the opening being shaped as an inclined surface or an arc surface, the rotating handle rotating so that the linking rod drives the fixing member, the fixing member protruding from the casing along the wall surface of the casing.

9. The lamp device fixing mechanism as claimed in claim 1, wherein the fixing member comprises a pressing surface configured to be in contact with an internal wall surface of the lamp rod, and the pressing surface comprises a rough surface or a plurality of nicks.

10. The lamp device fixing mechanism as claimed in claim 1, wherein the fixing member comprises an engaging block or a hook, and the lamp rod is adapted to comprise an engaging hole corresponding to the fixing member.

11. The lamp device fixing mechanism as claimed in claim 1, wherein the casing comprises a first stopping surface, and the rotating handle abuts against the first stopping surface when the fixing member is located at the first position.

12. The lamp device fixing mechanism as claimed in claim 11, wherein the casing comprises a second stopping surface, and a handle portion of the rotating handle is located next to the second stopping surface when the fixing member is located at the second position.

13. The lamp device fixing mechanism as claimed in claim 12, wherein the casing comprises a first segment portion, a second segment portion, and a breach located at a junction of the first segment portion and the second segment portion, the breach is formed by a plurality of inner side walls and configured to make room for the rotating handle to move, and the first stopping surface and the second stopping surface are respectively located at two opposite inner side walls of the inner side walls forming the breach.

14. The lamp device fixing mechanism as claimed in claim 1, wherein the fixing member is retracted into the casing when the fixing member is located at the first position, and the fixing member protrudes from the casing when the fixing member is located at the second position.

15. The lamp device fixing mechanism as claimed in claim 1, wherein the casing comprises a first segment portion, a second segment portion, and an abutting portion located between the first segment portion and the second segment portion, and the abutting portion of the casing is adapted to abut against a nozzle edge of the lamp rod when the first segment portion of the lamp device fixing mechanism is inserted into the lamp rod.

16. An illumination device, comprising:
   a lamp device;
   a lamp device fixing mechanism as claimed in claim 1, wherein the lamp device is fixed to the casing of the lamp device fixing mechanism; and
   a lamp rod, a portion of the casing of the lamp device fixing mechanism being partially inserted into the lamp rod, a fixing member of the lamp device fixing mechanism being fixed to the lamp rod when moving to a second position so as to fix the lamp device to the lamp rod.

17. The illumination device as claimed in claim 16, wherein the lamp rod has an engaging hole, and the fixing member extends into the engaging hole of the lamp rod when the fixing member is located at the second position.

* * * * *